United States Patent [19]

Gonzalez et al.

[11] 3,947,655
[45] Mar. 30, 1976

[54] CORED TYPE ELECTRODE WELDING

[75] Inventors: John Gonzalez, Willoughby; Robert P. Munz, Lyndhurst, both of Ohio

[73] Assignee: The Lincoln Electric Company, Cleveland, Ohio

[22] Filed: May 15, 1974

[21] Appl. No.: 469,963

[52] U.S. Cl. ................................. 219/146; 148/24
[51] Int. Cl.² ................................. B23K 35/22
[58] Field of Search ....... 219/137, 145, 146; 148/24

[56] References Cited
UNITED STATES PATENTS

| | | | |
|---|---|---|---|
| 3,328,212 | 6/1967 | Coless | 148/24 X |
| 3,424,892 | 1/1969 | Wilcox | 219/137 |
| 3,490,960 | 1/1970 | Arikawa et al. | 148/24 |
| 3,531,620 | 9/1970 | Arikawa et al. | 219/146 |
| 3,539,765 | 11/1970 | Duttera et al. | 219/146 |
| 3,625,757 | 12/1971 | Wiehe et al. | 219/146 X |
| 3,670,135 | 6/1972 | Zvanut | 219/146 X |
| 3,702,390 | 11/1972 | Blake et al. | 219/146 |
| 3,742,185 | 6/1973 | Parks | 219/137 X |
| 3,805,016 | 4/1974 | Soejima et al. | 219/146 |

*Primary Examiner*—J. V. Truhe
*Assistant Examiner*—N. D. Herkamp
*Attorney, Agent, or Firm*—Meyer, Tilberry & Body

[57] ABSTRACT

A cored type arc-welding steel electrode for the welding of 14 gauge to ⅜ inch thick mild steel wherein the ingredients in the core provide a smooth spray arc that is easy to control along with excellent bead appearance, low spatter, and good slag removal. The core ingredients include: calcium oxide, as a necessary compound, in a prefused mix to lower its hygroscopicity; aluminum and magnesium in controlled amounts; and selected fluorides.

17 Claims, No Drawings

CORED TYPE ELECTRODE WELDING

This invention pertains to the art of electric arc welding electrodes and more particularly to a cored type electrode capable of semi-automatically depositing weld beads on light gauge steel without the use of external shielding gas or flux.

By "semi-automatic" is meant feeding a welding electrode of indefinite length longitudinally past an electric contact forming part of a welding gun toward the workpiece to be welded and simultaneously manually advancing the gun laterally to deposit a weld bead.

In the art of semi-automatic welding of light gauge sheet metals, there are several methods used to shield the arc from the atmosphere. A solid wire and granular flux can be used but it is messy, requires a bulky gun, the weld puddle cannot be seen and out-of-position welding is extremely difficult, if not impossible. A solid wire and a shielding gas can be used and is quite popular, but often has some spatter and requires a bulky gun along with the attendant costly pressurized containers, pressure regulator valves, etc.

A self-shielded cored type welding electrode does not have the above problems; however, heretofore commercially available cored-type electrodes tended to have too high deposition rates for light gauge metals. One method used to weld thinner workpieces at the high deposition rates is to increase travel speed; however, for semi-automatic welding, this solution becomes impracticable because even a highly skilled weldor has difficulty accurately controlling the placement of the weld bead if travel speeds are much over 40 inches per minute. Another method used to weld thinner workpieces is to reduce the deposition rate by reducing the arc current and voltage. When this is done with presently available electrodes, the arc action deteriorates resulting in large droplet transfer, erratic metal transfer, and high spatter.

The present invention overcomes all of these problems and others and provides a cored-type electrode capable of fabricating, lighter thicknesses of mild steel which has a smooth spray arc which is easy to control with good visibility, low heat and glare, and which produces a bead with excellent appearance and low spatter.

In accordance with the present invention, a cored-type electrode of the character described is provided by employing a mixture of principal core ingredients including carefully controlled amounts of aluminum and magnesium metals, calcium oxide in a novel prefused mix with a metal oxide, and certain of the fluorides such as barium flouride, strontium fluoride, lanthum fluoride and/or a rare earth fluoride.

The non-metallics are held below a maximum level of 6.0% of the total electrode weight to avoid droplet transfer and/or spatter. No calcium fluoride or carbonates are used, since they are detrimental to desired arc action at lower current. The magnesium level is carefully controlled for optimum arc action. Lower levels than those stated below result in more droplet transfer and spatter. Higher levels result in increased arc force, spatter, and severe pocking. The calcium oxide is essential for good slag removal. Aluminum acts as a deoxidizer and its maximum amount is limited by the residuals permissible in the weld bead.

Calcium oxide in the slag is considered most desirable for good slag removal but heretofore could never be used, as such, in cored electrodes because of its tendency to pick up moisture during manufacture of the electrode and/or during storage of the finished electrode through the seam of the steel tube. While calcium oxide per se has been mentioned as a possible core ingredient in the literature, because of its hygroscopic properties, it has been used in the moisture stable forms of calcium carbonate or wollastonite ($CaO.SiO_2$). In a cored electrode the use of calcium carbonate in amounts to leave enough calcium oxide in the slag to have the desired improvements on slag removal would result in the release of so much carbon dioxide in the heat of the arc as to disrupt the welding arc that good welding could no longer be achieved. This was particularly so for light gauge welding. In the wollastonite form, the high percentage of silicon dioxide not only would reduce the electrode's ability to resist porosity but also would add silicon to the weld metal in such amounts as to be detrimental to its physical properties.

Thus, in accordance with the invention, calcium oxide is treated so as to be non-hygroscopic or to have its hygroscopicity reduced to an amount that moisture pick up will not be detrimental. While various means, e.g., encapsulating, may be employed to reduce these hygroscopic tendencies, preferably calcium carbonate ($CaCO_3$) is mixed with a controlled amount of certain of the metal oxides e.g. silicon dioxide, and the mixture heated to the melting temperature, thus, driving off the $CO_2$ in the calcium carbonate and fusing the resultant $CaO$ and $SiO_2$ together.

The amounts of calcium carbonate and silicon dioxide used must be controlled so that an ultimate ratio of approximately two molecular parts $CaO$ and one molecular part of $SiO_2$ ($2\ CaO.SiO_2$) results after melting. The minimum ratio is 1.5 parts $CaO$ to one part $SiO_2$. Such a mixture usually has a very high melting point and further in accordance with the invention, one or more of at least some of the fluorides hereinafter listed which will form part of the core ingredients are included in the mix to reduce the melting point of the mix to practical limits of manufacture.

A resulting fused composite of 28.5% $CaO$, 16.5% $SiO_2$ and 55% $BaF$ (in percents by weight) is preferred. Higher or lower percents of $BaF$ raise the melting temperature and result in erosion of the refractory lining of the crucible. Whether the resulting product is a mix or compound is unknown. The basic point is that the $CaO$ is so shielded from the moisture of the atmosphere such that the $CaO$ no longer has hygroscopic tendencies. Iron oxide $Fe_xO_x$ or manganese oxide ($Mn_xO_x$) may in some instances be substituted for the $SiO_2$ with some sacrifice in low current operation and slightly more spatter. Where $Fe_xO_x$ or $Mn_xO_x$ is used, the molecular ratio of $CaO$ to $Fe_xO_x$ or $Mn_xO_x$ can be up to but not greater than 2.0 $CaO$ to 1.0 $Fe_xO_x$ or 1.0 $Mn_xO_x$. The preferred molecular ratio falls between 1.0 $CaO$ to 1.0 $Fe_xO_x$ and 2.0 $CaO$ to 1.0 $Fe_xO_x$ or the substitution of $Mn_xO_x$ for $Fe_xO_x$ in those preferred ratios.

Thus, while $CaO$ is listed independently in the formulations for the light gauge metal electrode set out below, it will be understood that in all cases in accordance with the invention, it is only used in a manner so as to reduce its hygroscopic tendencies, e.g., in a novel fused composite with $SiO_2$ (or $Fe_xO_x$ or $Mn_xO_x$) and preferably one of the listed fluorides. When aluminum and/or magnesium is one of the core ingredients, the other metal oxides commonly used as a fluxing ingredient in arc welding are undesirable.

Iron powder is used as a bulking agent in the mix as is conventional in cored electrodes.

The magnesium is preferably added in the form of an aluminum-magnesium alloy which appears to retard the boiling of the magnesium so that it can be effective in the arc.

The tube is made from a conventional low carbon mild steel. The electrode is for welding in air, i.e., no externally supplied shielding gas or flux is used or is desirable.

The following will indicate generally the ingredients and the preferred ranges thereof which may be used in making up our present improved arc welding electrode in weight percent of the total electrode weight: (Excluding any alloying metals or carbon in the steel tube.)

|  | Basic Ingredients | With Prefused CaO |
|---|---|---|
| Aluminum | 1.7 to 4.0 | 1.7 to 4.0 |
| Magnesium | 0.5 to 0.8 | 0.5 to 0.8 |
| Barium fluoride or |  |  |
| Strontium fluoride or |  |  |
| Lanthanum fluoride or |  |  |
| Rare earth fluorides | 2.0 to 4.5 | 0.9 to 2.5 |
| Calcium oxide | 0.5 to 0.8 | — |
| Lithium fluoride | 0.0 to 0.3 | 0.0 to 0.3 |
| Silicon dioxide | 0.25 to 0.4 | — |
| Carbon | 0.0 to 0.4 | 0.0 to 0.4 |
| Manganese metal | 0.0 to 4.0 | 0.0 to 4.0 |
| Fused composite of: 28.5% CaO; 16.5% SiO$_2$; and 55% Ba, Sr, La and/or rare Earth flourides | — | 1.5 to 3.0 |
| Iron powder and steel tube | Balance | Balance | the ratio of Calcium oxide to silicon dioxide being held within the limits discussed above.

More specifically, the following specific formulation has been found satisfactory in practice:

|  | Basic Analysis | With Prefused CaO |
|---|---|---|
| Aluminum | 2.5 to 3.4 | 2.5 to 3.4 |
| Magnesium | 0.6 to 0.8 | 0.6 to 0.8 |
| Barium fluoride | 2.5 to 3.4 | 1.5 to 2.4 |
| Calcium oxide | 0.6 to 0.8 | — |
| Lithium fluoride | 0.1 to 0.2 | 0.1 to 0.2 |
| Silicon dioxide | 0.3 to 0.4 | — |
| Carbon | 0.25 to 0.34 | 0.25 to 0.34 |
| Manganese metal | 0.2 to 0.26 | 0.2 to 0.26 |
| Fused composite of: 28.5% CaO; 16.5% SiO$_2$; 55% BaF | — | 2.0 to 2.6 |
| Iron Powder | 12.5 to 16.5 | 12.5 to 16.5 |
| Steel tube | remainder | remainder |
| A specific preferred formulation is: |  |  |
| Aluminum (55%) - Magnesium (45%) Alloy |  | 1.44 |
| Aluminum |  | 2.0 |
| Manganese metal |  | .22 |
| Carbon |  | .28 |
| Iron Powder |  | 13.20 |
| Barium Fluoride |  | 1.61 |
| Lithium Fluoride |  | .18 |
| Fused composite of: Calcium Oxide 28.5%; Silicon Dioxide 16.5%; and, Barium Fluoride 55% |  | 2.15 |
| Steel Tube |  | Balance |
|  |  | 100.00% |

The various ingredients in finely powdered form are thoroughly mixed, deposited in the trough of a U-shaped steel ribbon and the edges of the ribbon brought into abutting engagement. The resulting electrode is then passed through drawing dies to reduce the external diameter to preferably an electrode having either 3/32 inch or 5/64 inch external diameter.

Typical machine settings for a 3/32 inch electrode are 21 arc volts, 270 amperes (D.C. −) 1 ± ⅛ inch electrode stickout, travel speed 18 inches per minute to make a ¼ inch fillet weld.

For the 5/64 inch electrode, it is preferred to use 18 arc volts, 220 amps (D.C. −) 1 ± ⅛ inch electrode stickout, travel speed 16 inches per minute to make a 3/16 inch fillet weld.

For the 3/32 inch electrode, a current range of 175–280 amperes is preferred and for the 5/64 inch electrode, a current range of 130–240 amps is preferred. At higher currents, complete spray transfer results with a loss of protection.

The electrode possesses a smooth spray transfer arc and produces very low smoke and smoke residue and practically no spatter.

The electrode is primarily intended for materials from 14 gauge to ⅜ inch thick.

Because of the low power requirements for the arc and low spatter of the electrode, it is possible to use a special copper cone (similar to gas welding) on the end of the electrode nozzle as a guide enabling drag type welding techniques to be employed on these relatively thin workpieces.

For out of position welding, it has been found that current settings 20–40 amperes lower and 1–2 volts lower than those above specified are desirable.

The invention has been described with reference to a preferred embodiment. Obviously, modifications and alterations will occur to others upon a reading and understanding of this specification and it is our intention to include such modifications and alterations insofar as they come within the scope of the appended claims.

Having thus described our invention, we claim:

1. In a cored type steel electrode suitable for arc welding in air without a shielding gas consisting of the following ingredients in weight percent of the total electrode:

a - Aluminum     1.7 to 4.0
   b - Magnesium     0.5 to 0.8 c. one or more fluorides selected from the class consisting of:
   Barium fluoride, Strontium fluoride, Lanthanum fluoride and the rare earth fluorides     2.0 to 4.5 d. one or more oxides selected from the class consisting of:
   Silicon dioxide, iron oxide and manganese oxide 0.25 to 0.4 e - Calcium oxide     0.5 to 0.8
   f - Lithium fluoride     0.0 to 0.3
   g - Carbon     0.0 to 0.4
   h - Manganese metal     0.0 to 4.0 i. The balance being Iron powder and a steel tube,
   j. The improvement which comprises: the calcium being present in a prefused composite with the selected oxide(s) and the selected fluoride(s).

2. The cored type steel electrode of claim 1 wherein said ingredients have the following range of ingredients in weight percent:

| | |
|---|---|
| Aluminum | 2.5 to 3.4 |
| Magnesium | 0.6 to 0.8 |
| Barium fluoride | 2.5 to 3.4 |
| Calcium oxide | 0.6 to 0.8 |
| Lithium fluoride | 0.1 to 0.2 |
| Silicon dioxide | 0.3 to 0.4 |
| Carbon | 0.25 to 0.34 |
| Manganese Metal | 0.2 to 0.26 |
| Iron powder | 12.5 to 16.5 |
| Steel tube | Balance | the Calcium oxide being present in a prefused composite with the oxide and a fluoride.

3. The electrode of claim 2 wherein the composite has a molecular ratio of from 1½ to two parts CaO to one part $SiO_2$ with barium fluoride used to reduce the melting point of the composite.

4. The electrode of claim 3 wherein the composite has approximately 28.5% CaO, 16.5% $SiO_2$ and 55% BaF.

5. The electrode of claim 2 wherein said ingredients consist of:

| | |
|---|---|
| Aluminum (55%)-Magnesium (45%) Alloy | 1.44 |
| Aluminum metal | 2.0 |
| Manganese metal | 0.22 |
| Carbon | 0.28 |
| Iron powder | 13.20 |
| Barium fluoride | 0.18 |
| Fused composite of: calcium oxide 28.5%; silicon dioxide 16.5%; and barium fluoride 55% | 2.15 |
| Steel Tube | Balance |
| | 100.00%. |

6. The electrode of claim 1 wherein the composite has a molecular ratio of from 1½ to 2.0 parts CaO to 1.0 part $SiO_2$ with barium fluoride used to reduce the melting point of the composite.

7. An arc welding electrode for mild steel comprised of a steel tube having flux materials on the inside thereof, said flux materials containing aluminum and as an essential ingredient: a fused composite consisting of calcium oxide and one or more compounds selected from the class consisting of silicon dioxide, iron oxide, and one or more fluorides selected from the class consisting of:
Barium fluoride,
Strontium fluoride,
Lanthanum fluoride, and
Rare earth fluorides 8. The electrode of claim 7 wherein the molecular ratio is between 1.5 to 2.0 CaO to 1.0 $SiO_2$.

9. In an arc welding electrode for welding mild steel in air comprised of a steel tube having on the inside thereof fluxing ingredients, the improvement which consists in said ingredients including aluminum and as an essential ingredient, a prefused composite consisting of: calcium oxide; one or more metal compounds selected from the class consisting of: silicon dioxide, manganese oxide, and iron oxide, and, one or more compounds selected from the class consisting of: barium fluoride, strontium fluoride, lanthanum fluoride and the rare earth fluorides.

10. The electrode of claim 9 wherein the oxide is of iron and the molecular ratio 2.0 –1.0 calcium oxide to 1.0 iron oxide.

11. The electrode of claim 9 wherein the oxide is of manganese and the molecular ratio 2.0–1.0 calcium oxide to 1.0 manganese oxide.

12. A cored type steel electrode suitable for arc welding in air without a shielding gas consisting of the following ingredients in weight percent of the total electrode:

| | |
|---|---|
| a. Aluminum | 1.7 to 4.0 |
| b. Magnesium | 0.5 to 0.8 | c. a fluoride selected from the class consisting of:
Barium fluoride,
Strontium fluoride,
Lanthanum fluoride,
Rare earth fluorides   2.0 to 4.5 d. A metal oxide selected from the class consisting of:

| | |
|---|---|
| Silicon dioxide, iron oxide and[/or] manganese oxide | 0.25 to 0.4 |
| e. Calcium oxide | 0.5 to 0.8 |
| f. Lithium fluoride | 0.0 to 0.3 |
| g. Carbon | 0.0 to 0.4 |
| h. Manganese metal | 0.0 to 4.0 |
| i. Iron powder and Steel Tube | Balance | j. said calcium oxide being present as a prefused composite with at least one of the selected oxides.

13. The cored type steel electrode of claim 12 wherein said ingredients have the following range of ingredients in weight percent:

| | |
|---|---|
| Aluminum | 2.5 to 3.4 |
| Magnesium | 0.6 to 0.8 |
| Barium fluoride | 2.5 to 3.4 |
| Calcium oxide | 0.6 to 0.8 |
| Lithium fluoride | 0.1 to 0.2 |
| Silicon dioxide | 0.3 to 0.4 |
| Carbon | 0.25 to 0.34 |
| Manganese Metal | 0.2 to 0.26 |
| Iron powder | 12.5 to 16.5 |
| Steel tube | Balance. |

14. In an arc welding electrode for welding mild steel in air comprised of a steel tube having on the inside thereof fluxing ingredients including aluminum, the improvement which comprises: said ingredients including as an essential ingredient, a prefused composite consisting of: calcium oxide and one or more metal oxides selected from the class consisting of: silicon dioxide, manganese oxide, and iron oxide.

15. The electrode of claim 14 wherein the oxide is of iron and the molecular ratio is approximately 2.0 to 1.0 calcium oxide to 1.0 iron oxide.

16. The electrode of claim 14 wherein the oxide is of manganese and the molecular ratio is approximately 2.0 to 1.0 calcium oxide to 1.0 manganese oxide.

17. The electrode of claim 14 wherein the oxide is of silicon and the molecular ratio is approximately 1.5 to 2.0 calcium oxide to 1.0 silicon dioxide.

* * * * *

UNITED STATES PATENT AND TRADEMARK OFFICE
CERTIFICATE OF CORRECTION

PATENT NO. : 3,947,655
DATED : March 30, 1976
INVENTOR(S) : John Gonzalez and Robert P. Munz It is certified that error appears in the above-identified patent and that said Letters Patent are hereby corrected as shown below:

Claim 1, column 4, line 66, insert

---oxide---after "calcium".

Signed and Sealed this

Twenty-third Day of November 1976

[SEAL]

Attest:

RUTH C. MASON
Attesting Officer

C. MARSHALL DANN
Commissioner of Patents and Trademarks